United States Patent [19]
Wolfe

[11] Patent Number: 5,486,127
[45] Date of Patent: Jan. 23, 1996

[54] CONFIGURED OR KEYED CONNECTOR SYSTEM

[76] Inventor: Michael Wolfe, 101 W. 90th St., New York, N.Y. 10024

[21] Appl. No.: 366,832

[22] Filed: Dec. 30, 1994

[51] Int. Cl.⁶ .......................... A63H 33/06; A63H 3/16; A41F 1/00; A43C 11/00
[52] U.S. Cl. .................. 446/120; 446/97; 24/578; 24/700
[58] Field of Search .................. 446/120, 121, 446/125, 97, 98, 99; 24/578, 662, 700

[56] References Cited

U.S. PATENT DOCUMENTS

| | | |
|---|---|---|
| 2,397,801 | 4/1946 | Mitchell . |
| 2,662,335 | 12/1953 | Calverley . |
| 2,947,053 | 8/1960 | Sanderson ........................ 24/662 |
| 2,995,833 | 8/1961 | Bezark . |
| 3,066,501 | 12/1962 | Charles et al. .................... 24/578 X |
| 3,461,514 | 8/1969 | Morris . |
| 3,545,798 | 12/1970 | Swett .............................. 24/662 X |
| 3,822,499 | 7/1974 | De Vos . |
| 4,200,995 | 5/1980 | Trella . |
| 4,575,345 | 3/1986 | Wager . |
| 4,947,527 | 8/1990 | Hennig ........................... 24/662 X |
| 5,000,713 | 3/1991 | Cheng ............................ 446/120 |
| 5,239,407 | 8/1993 | Pollock ........................ 446/121 X |
| 5,378,184 | 1/1995 | Bro et al. ........................ 446/99 |
| 5,380,233 | 1/1995 | Numoto ....................... 446/99 X |

FOREIGN PATENT DOCUMENTS

| | | | |
|---|---|---|---|
| 170901 | 3/1960 | Switzerland ................... 24/578 |
| 744850 | 2/1956 | United Kingdom ............ 24/578 |
| 796303 | 6/1958 | United Kingdom ............ 24/662 |

Primary Examiner—Robert A. Hafer
Assistant Examiner—D. Neal Muir

[57] ABSTRACT

A system for coupling components of toy assemblages, educational models, hobby constructions, component attachments, or the like together using a compact single point snap together axial connector, which is configured or formed with a key like portion included as part of the male connector part, and a corresponding female connector configured to prevent rotational movement about the connectors axis, and/or to limit the selective attachment of the components.

6 Claims, 2 Drawing Sheets

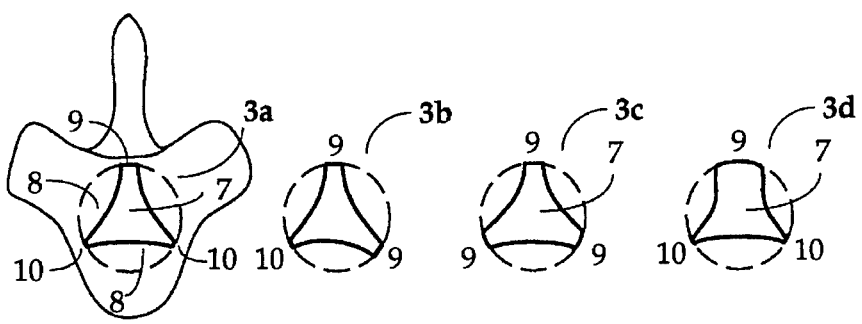
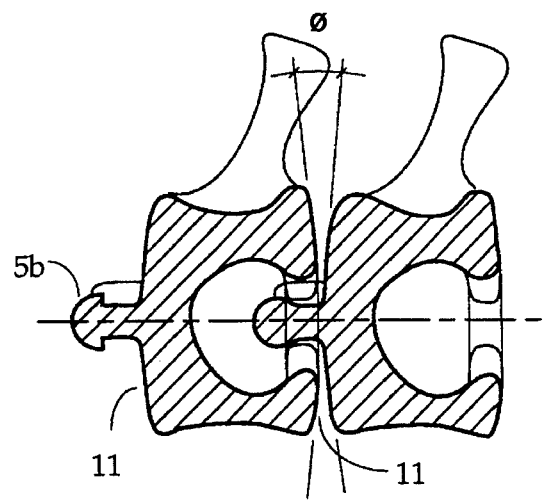
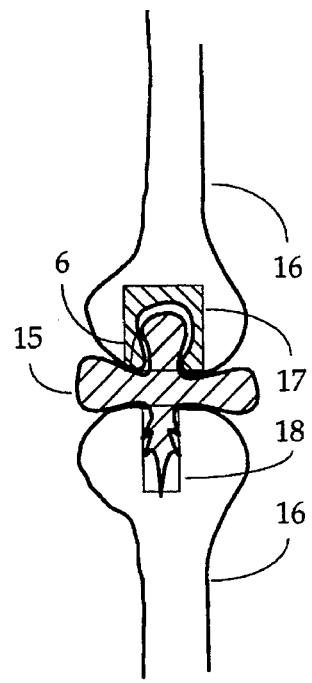
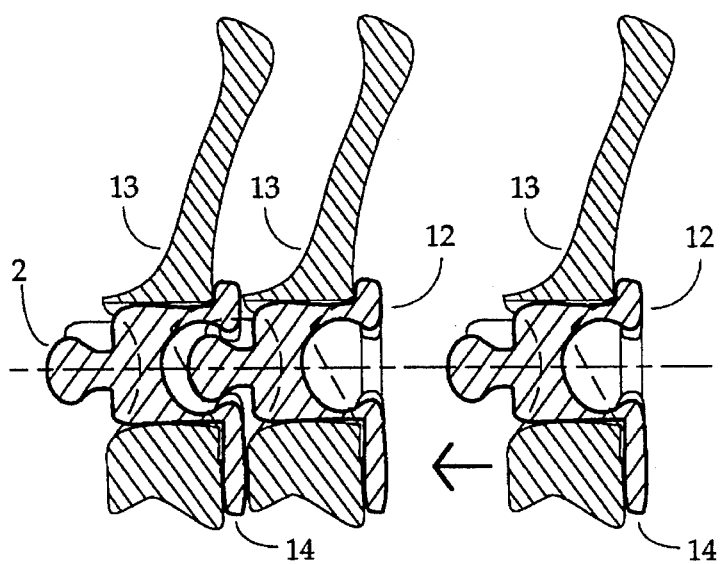

CONFIGURED OR KEYED CONNECTOR SYSTEM

BACKGROUND OF THE INVENTION

This invention relates to an improvement on a snap connector, namely a single point axial connector with a formed configuration or key like portion to prevent rotational movement about its axis and/or for the selective attachment of components of toy assemblages, educational models, hobby constructions, component attachments or the like.

While there are many examples of patents of snap together connectors, this invention is directed to a single point axial connector with a key component molded thereto or configured in such a fashion to prevent axial rotation of the component part by virtue of the key feature or configured end of the male connector not being able to axially rotate within the corresponding female opening.

There are many instances where there is a need for a compact axial snap together connector, and also a need to prevent rotation about the axis of the components connected and or to have selective attachment. One example of the use of these connectors is a skeletal model, where each consecutive bone segment would be connected only in a single position, without rotation, so that the correct positioning in the configuration of the model or toy is maintained. In the past, skeletal models have been wired together which is complicated and time consuming, Once wired together, these skeletal models are not meant to be disassembled and reassembled. In U.S. Pat. No. 2,995,833 by Bezark and U.S. Pat. No. 4,200,995 by Trella, ball in socket connectors are used, however they do not describe any keying or shaping of the connector to prevent rotation about the connectors axis, and therefore do not address positioning and maintaining each component in their proper position. The skeletal model is an example where a keyed selective connection is desired, so that the parts could also be assembled in such a way as to maintain the correct order of placement of the constituent components.

Since many skeletal model sets are assembled by wiring the bones together, most younger students do not have the dexterity, the patience, nor the time during one school period to accomplish such a construction. Such constructions, using this invention may be easily assembled, increasing the recreational, educational or functional value of the construction by requiring less dexterity and time in assembling the objects. There is also an educational value from assembling such constructions due to the participation and experience one obtains from building the construction itself.

In patents such as U.S. Pat. No. 2,662,335 by Calverley, ball and socket snap together connectors are employed, however there is no intention nor desire to restrain the rotation of the component parts. The same is true of U.S. Pat. No. 3,822,499 by DeVos.

There are several component systems which employ ball and socket configurations with axially attached components and also prevent rotation of the components which are being attached together, however several ball and socket sets are required on each component face in order to achieve this condition. In U.S. Pat. No. 4,947,527 by Hennig, however, two sets of ball and sockets must be employed specifically to prevent rotation and maintain alignment.

U.S. Pat. No. 2,397,801 by Mitchell, and one embodiment of U.S. Pat. No. 3,461,514 by Morris are strips which employ several ball and socket connectors, which when connected, prevents rotation of the attached component. However this connection is also one of ball and sockets along a lateral face rather than a single axial one. Prior to the present invention, the problem of making a single point, compact, non-rotational connector has not been addressed.

SUMMARY OF THE INVENTION

It is the object of this invention to provide a coupling means which permits components to be snap connected together (or disengaged) in a single point axial rigid connection, and likewise be unsnapped if desired with a predetermined amount of physical force, with the additional configuration of shape or a key, formed as part of the connector to prevent rotation about its axis and/or limit the selectivity of the components being joined. Some examples include again skeletal models, educational, toy construction sets as well as other component attachments.

This invention is especially useful in situations where components that are to be connected are especially small, where rotational restraint is required, and so a single point attachment is more conducive as a connector than one that requires multiple connectors.

The object is achieved by including a configured area or one or more keys to a male button head connector so that it will engage a female opening only in a certain selective position or positions wherein any rotational movement is prevented or restricted. Another object that can be achieved is that only a certain connector, because of its configuration or keying, will only engage its like female counterpart.

Another beneficial feature of this connector is that it can be entirely concealed within the components to be connected.

There are many uses of this invention, including snap together toy construction sets, construction models, instruction kits such as skeletal kits as shown in FIG. 1, or any of a number of uses to connect components together in this fashion.

BRIEF DESCRIPTION OF THE DRAWINGS

FIG. 6 A–D are elevation views of some different female coupling configurations.

FIG. 7 is a section view of an example of an connector with flexure.

FIG. 8 is a sectional view of connector inserted within component parts.

FIG. 9 is a sectional view of single sided connectors inserted into component parts.

DETAILED DESCRIPTION OF THE INVENTION

The present invention provides a system for coupling components in which a male connector is engaged with a female connector and rotational movement about the axis of the male and female connectors is restricted. The male connector and female connector can be in separate pieces or both male and female connectors may be molded into a single piece.

The male connector is a first component part from which projects a button head connector. The button head connector has a shaft which may have a ball end having a larger diameter than the shaft or may have a configured end which has a larger diameter than the shaft. If the button head connector has a ball end, then there will be at least one key adjoining the button head connector.

The female connector is a second component part which has a female receptor integrally formed in the second component part. The female receptor is surrounded by scalloped edges to receive and hold the configured end or the ball end and adjoining key of the male connector. The female connector may also have one or more integrally formed slots in the second component part to enable multiple positioning of the male connector when the button head connector has a ball end and an adjoining key. The slot may be wider than the key of the male connector to provide a controlled amount of displacement about the axis of the male and female connectors. If desired, more than one slot may be wider than the key of the male connector. When the button head connector of the male connector has a configured end, then, instead of slots, the female connector will have at least one opening integrally formed in the second component part for either singular or multiple positioning of the male connector. As when slots are used, the opening may be wider than the configured end of the male connector to provide a controlled amount of displacement about the axis of the male and female connectors and more than one opening may be wider.

The male and female connectors can be made of flexible material to allow tortional flexure when the male connector is engaged with the female connector. The component parts of the male and female connectors can be shaped to allow flexure of the component parts when the male connector is engaged with the female connector.

Figure 1:
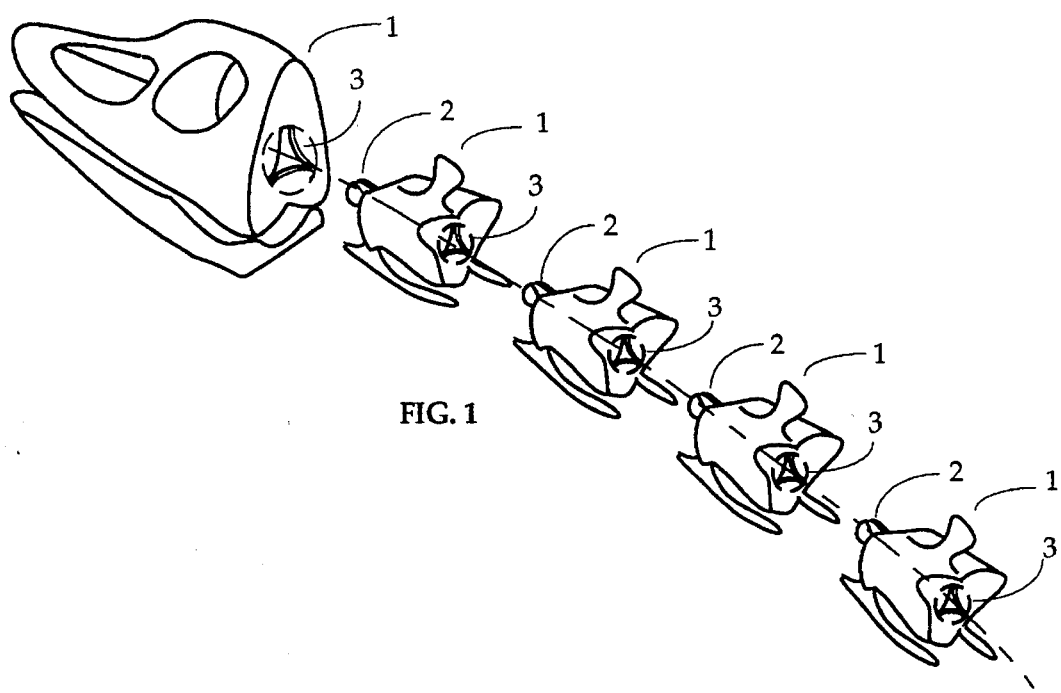
FIG. 1 is a perspective view of several units of a skeletal assembly.

One embodiment of the use of the present invention is the coupling together of components such as the skeletal construction set shown in FIG. 1, where a set of components can be snapped together in a particular fashion and in predetermined positions to form a larger object and likewise be unsnapped apart again into its constituent pieces. The connectors can be molded together with the component pieces and are preferably made of plastic or metal or other formed type of material.

Figure 2:
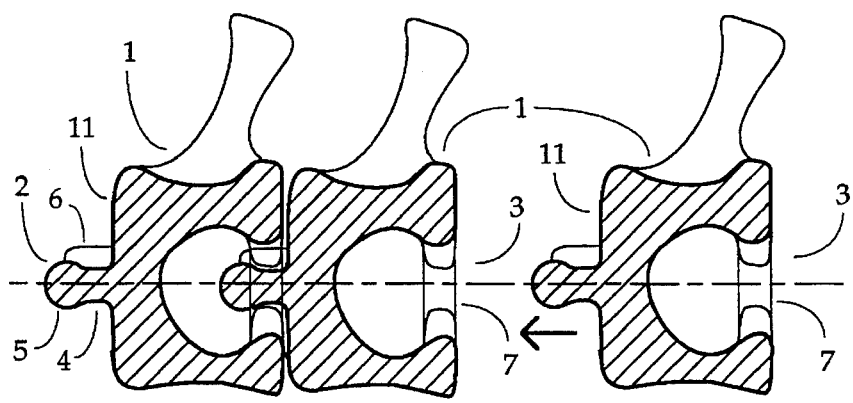
FIG. 2 is a cross sectional view of the connectors, integral with the component parts of FIG. 1.

Each component piece 1 has either a male connector 2 or a female receptor 3 or both, but may also have a plurality of each. FIG. 2 shows a cross section of components with integral male and female connector parts. The male connector 2 comprises a button head connector having a neck or shaft 4 integrally attached to the component part 1, with a ball or configured head 5 which is of a larger diameter than the attaching neck portion, and which also has a key like formation 6 adjoining the button head connector or can have multiple key formations as in FIG. 4.

Figures 3, 4, 5:
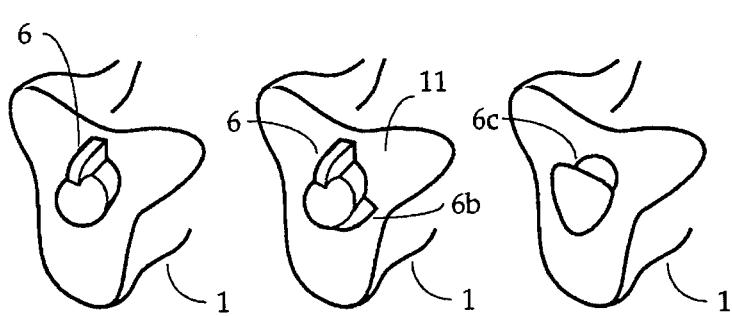
FIG. 3 is an axiometric view of one example of an integral male connector.
FIG. 4 is an axiometric view of a multiple key male connector.
FIG. 5 is an axiometric view of an amorphically configured male connector.

In FIG. 5 is shown a connector which is amorphically configured or shaped. The male connector may have an amorphically configured end, which because of its non cylindrical shape constrains rotation about its axis.

All the connectors are preferably, compact with rounded edged male heads without sharp edges for ease of insertion and removal and limiting snagging and broken edges.

The female connector 3 in FIG. 2 is an opening integrally formed in the component piece which receives the male connector 2. The female connector comprises an opening or female receptor 7 in which the head of the male connector passes through and snaps in place. The female receptor has scalloped edges 8 which have a certain amount of flexibility in order for the male connector which has a slightly larger head 5 to pass through using a certain amount of physical pressure into a void molded within the component. Once the head of the male connector passes through the opening, the scalloped edges 8 of the female receptor 3 resumes their original position entrapping the ball like end 5 of the male connector 2 thus securing the components together.

Because the shape of the male connector along with its adjoining key or configuration, would be restrained from rotating in its corresponding female receptor, then the components are similarly restrained about the axis of the connector. It is also an embodiment of this invention that the male connector and its adjoining key or keys be together as a single compact mass and to prevent rotation about the axis of the connector in that its inherent shape is not simply a ball or cylindrical shape.

It is intended that the connection may be either designed that the components 1 may then be either unsnapped with a pre-designed amount of force, or left in a rigid connection. A male connector which would be appropriate for a connector which is not designed to be unsnapped is shown as element 5b in FIG. 7.

In FIG. 6 the scalloped edges 8 of the female receptor 3 are designed with a formed key slot or slots 9 and a closed down or narrowed portion 10 so that the key portion 6 of the male connector may pass through the formed key slot or slots 9 in only that position that is intended for the component piece to align and not through the closed down or narrowed portion 10 where the connector key is not intended to pass through. The amount of force required to achieve connection would be determined by the size of the head of the male connector in relation to the constriction and the flexibility of the scalloped areas of the female connector opening.

FIGS. 6A–6D shows elevations of several different possible configurations of the female connector opening showing some possible alignments which may be achieved. A single position alignment is shown in FIG. 6A where a single keyed connector of similar shape would be able to pass through and be fixed and restrained from rotation in one position only. For instance the shape of the male connector in FIG. 3 would fit into the female connector opening in FIG. 6A but not a male connector such as illustrated in FIG. 4 which has a double keyed male connector. In FIG. 6B shows a two way female alignment position for a single key, or a single position for a similar multiple key slot. A multiple key and slot arrangement would be conducive for the selective attachment of components. FIG. 6C is yet another combination of possible connection positions, and many further combinations, configurations and shapes are possible and are included within the framework of this invention. FIG. 6D shows a widened key connector slot at top which, being wider than the key on the male connector side, would permit an intended amount of twist or displacement about the axis of the connector.

It is intended that the configuration of key formations or the configured shape of the male connector, or the shape or number of scallops at the opening edge of the female receptor may vary within this invention.

If in some cases, where it is desirous by design, that the components are intended to rotate about the axis of the connection in the same construction, then those connectors may be designed without a positioning or restraining key type element as described for this invention.

Another embodiment of this invention comprises the aspect where the components, which are being connected together, are shaped in such a way as to allow a designed amount of flexure of the component parts perpendicular to the axis of the connector as shown in FIG. 7. The relative limit of flexure is created by the extent of the splay of the mating surfaces of the connector faces 11 perpendicular to the axis of the connector and is shown by the angle φ in FIG. 7. The flexure can be created in one or more directions about the axis of the connector face 11 or limited by design. The flexure of the components can be designed so as to remain in a reformed position, or to return to its original shape or position.

The connector elements can also be made of a flexible type of material which would permit a certain amount of torsion or twist to the configuration.

Another use for this connector would be for providing the connection of other existing elements, for instance natural bone. In FIG. 8 is shown a molded keyed connector 12 inserted into existing component 13, in this case natural bone vertebra, in which the connector can be glued, frictionally form fit or attached in other various ways into a pre-existing cavity or similarly anchored into a bored hole. In this embodiment in FIG. 8. Both the male and the female connector are molded into a single piece, but it may be also configured in separate pieces. The connector 12 as shown has a flange area 14 representing cartilage section between the natural bone segments.

In FIG. 9 a split keyed connector is shown where the male keyed connector 15 is inserted into a bored hole 18 of an existing component 16, again in this case a natural bone. A keyed connector female insert 17 is anchored into a drilled or existing hole in the natural bone. The connector 15 can be a direct concealed connection, or have a visable portion such as a disc of emulated cartilage as shown.

Therefore, in view of the foregoing I claim:

1. A system for coupling components comprising:
   (a) a first component part with a male connector extending therefrom, the male connector comprising:
      (i) a button head connector with a circular end having a diameter, a shaft, having a diameter and an axis, connecting the button head end to the component part, with the circular end having a larger diameter than the attaching shaft, and
      (ii) at least one key adjoining and extending radially outwardly from at least one of the button head end, the shaft, and the component part; and
   (b) a second component part with a female receptor integrally formed in the second component part having a central opening surrounded by scalloped edges between which are configured at least one positioning slot, the positioning slot(s) radiating from the central opening to receive said key(s) as the male button head connector is engaged in the female receptor.
   wherein the key of the male connector when the male connector is engaged with the female receptor restrains rotational movement about the axis of the male and female connectors.

2. The system for coupling components of claim 1, wherein the female receptor further comprises at least two slots integrally formed in the second component part for multiple positioning of the male connector.

3. The system for coupling components of claim 2, wherein the slot in the female receptor is wider than the key of the male connector to provide a controlled amount of displacement about the axis of the male connector and female receptor.

4. The system for coupling components of claim 1, wherein the first component part of the male connector and the second component part of the female receptor are shaped to allow flexure of the first and second component parts when the male connector is engaged with the female receptor.

5. The system for coupling components of claim 1, wherein the male connector and the female receptor are made of flexible material to allow torsional flexure when the male connector is engaged with the female receptor.

6. The system for coupling components of claim 1, wherein the male connector and the female receptor are molded into a single piece.

* * * * *